(12) United States Patent
Vivanco

(10) Patent No.: US 12,413,294 B2
(45) Date of Patent: Sep. 9, 2025

(54) METHODS, SYSTEMS, AND DEVICES FOR IDENTIFYING AN AERIAL BASE STATION IN MOBILE NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 498 days.

(21) Appl. No.: 17/977,488

(22) Filed: Oct. 31, 2022

(65) Prior Publication Data

US 2024/0146394 A1 May 2, 2024

(51) Int. Cl.
*H04B 7/185* (2006.01)
*H04W 48/16* (2009.01)

(52) U.S. Cl.
CPC ........ *H04B 7/18504* (2013.01); *H04W 48/16* (2013.01)

(58) Field of Classification Search
CPC .......................... H04W 48/16; H04B 7/18504
USPC ......................................................... 370/316
See application file for complete search history.

(56) References Cited

U.S. PATENT DOCUMENTS

| 2015/0236778 A1* | 8/2015 | Jalali | H04W 36/304 370/316 |
| 2018/0102831 A1* | 4/2018 | Murphy | B64U 10/13 |

* cited by examiner

*Primary Examiner* — Temica M Beamer
(74) *Attorney, Agent, or Firm* — Guntin & Gust, PLC; Atanu Das

(57) ABSTRACT

Aspects of the subject disclosure may include, for example, obtaining a first extended cell global identifier (ECGI) of an aerial base station (ABS), determining a location of the ABS, and determining that a terrestrial base station (TBS) is within a distance threshold of the location of the ABS. Further embodiments include providing the first ECGI of the ABS to the TBS, and providing instructions to the TBS to obtain an ECGI from each terrestrial communication device (TCD) communicatively coupled to the TBS. Each of the TCDs obtain the ECGI for each neighboring base station. The TCDs provide the ECGIs to the TBS. Additional embodiments include configuring a neighboring list with the ECGIs of the neighboring base stations, and providing instructions to the TBS to identify as high priority a second ECGI of the ABS within the neighboring list based on the first ECGI of the ABS. Other embodiments are disclosed.

20 Claims, 13 Drawing Sheets

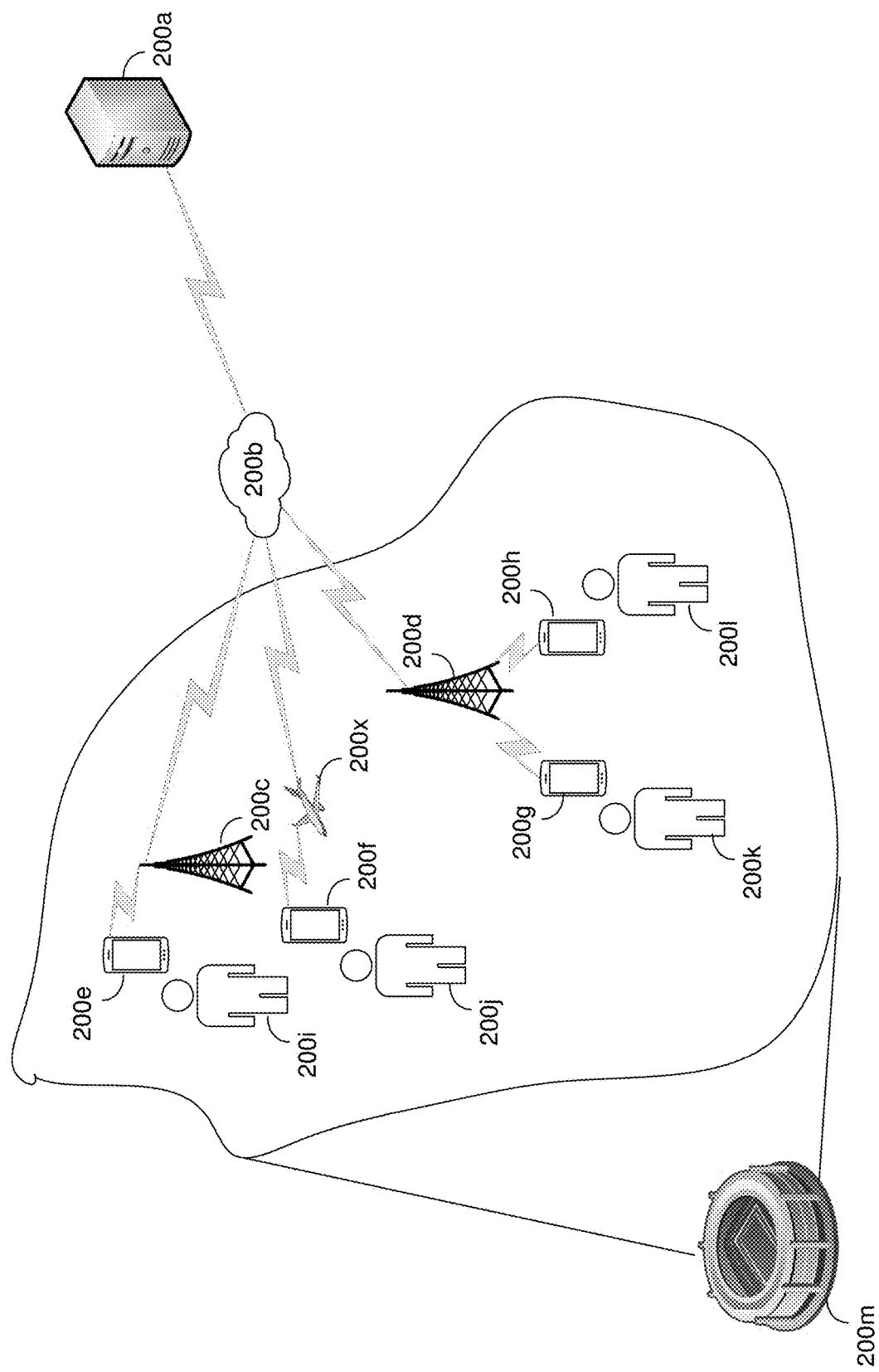

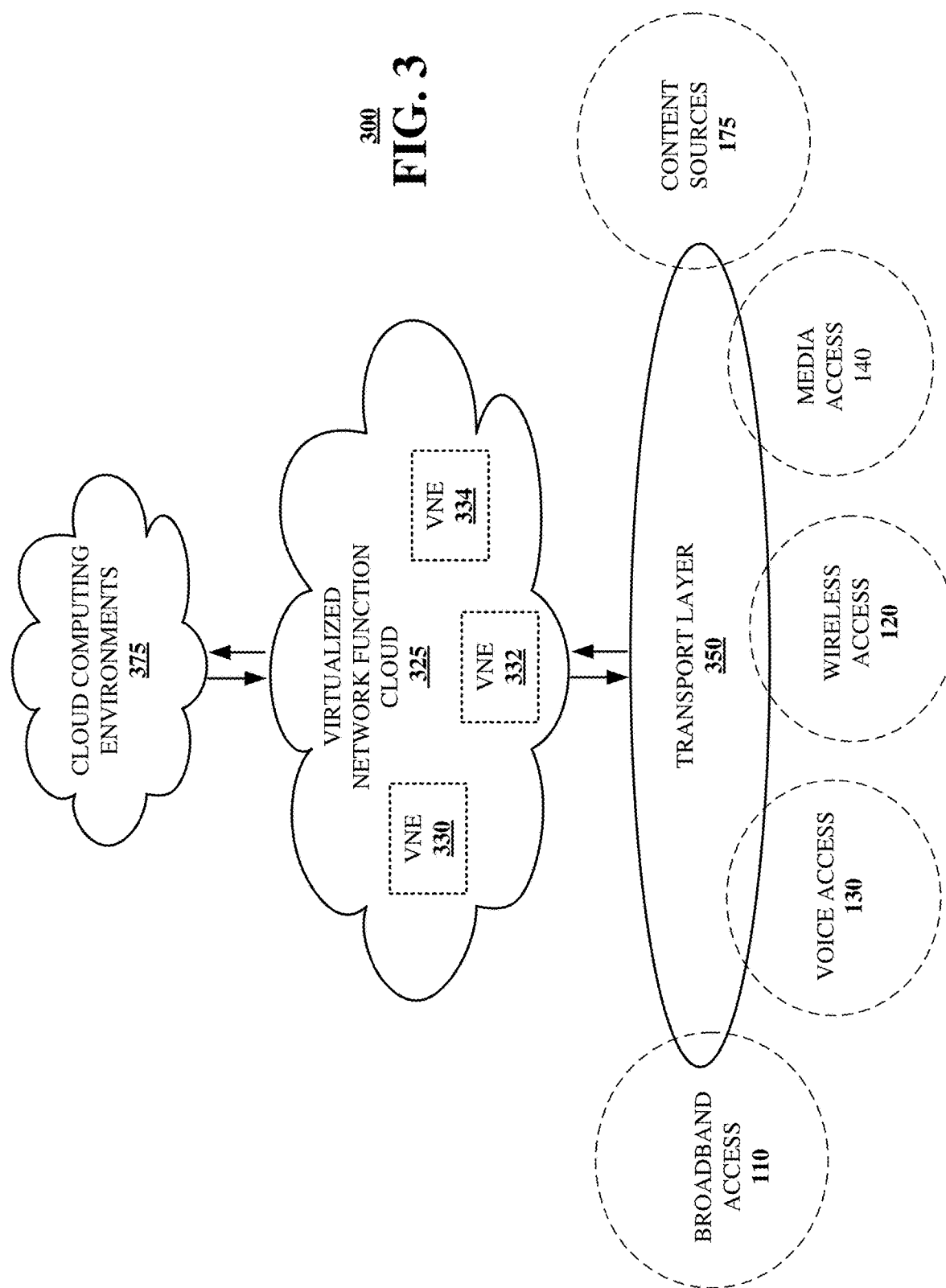

METHODS, SYSTEMS, AND DEVICES FOR IDENTIFYING AN AERIAL BASE STATION IN MOBILE NETWORKS

FIELD OF THE DISCLOSURE

The subject disclosure relates to methods, systems, and devices for an identifying aerial base station in mobile networks.

BACKGROUND

In the current state of art, many use cases of unmanned aerial vehicles (UAVs) require beyond visual line-of-sight (LOS) communications. Mobile networks offer wide area, high speed, and secure wireless connectivity, which can enhance control and safety of UAV operations and enable beyond visual LOS use cases. Current LTE networks can support initial UAV deployments. LTE evolution and 5G mobile networks can provide more efficient connectivity for wide-scale UAV deployments. Further use cases of commercial UAVs are growing rapidly, including delivery, communications and media, inspection of critical infrastructure, surveillance, search-and-rescue operations, agriculture, etc.

Current mobile broadband communication (i.e., LTE) has been primarily directed to terrestrial communications. However, UAVs can be deployed to provide mobile network connectivity to terrestrial user end devices or terrestrial communication devices, thereby acting as an aerial base station. Some current deployments of aerial base stations include aerial base station provide connectivity to LTE mobile networks to terrestrial communication devices in the aftermath of disasters or during large events.

BRIEF DESCRIPTION OF THE DRAWINGS

Reference will now be made to the accompanying drawings, which are not necessarily drawn to scale, and wherein:

FIG. 2A-2D is a block diagram illustrating example, non-limiting embodiments of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
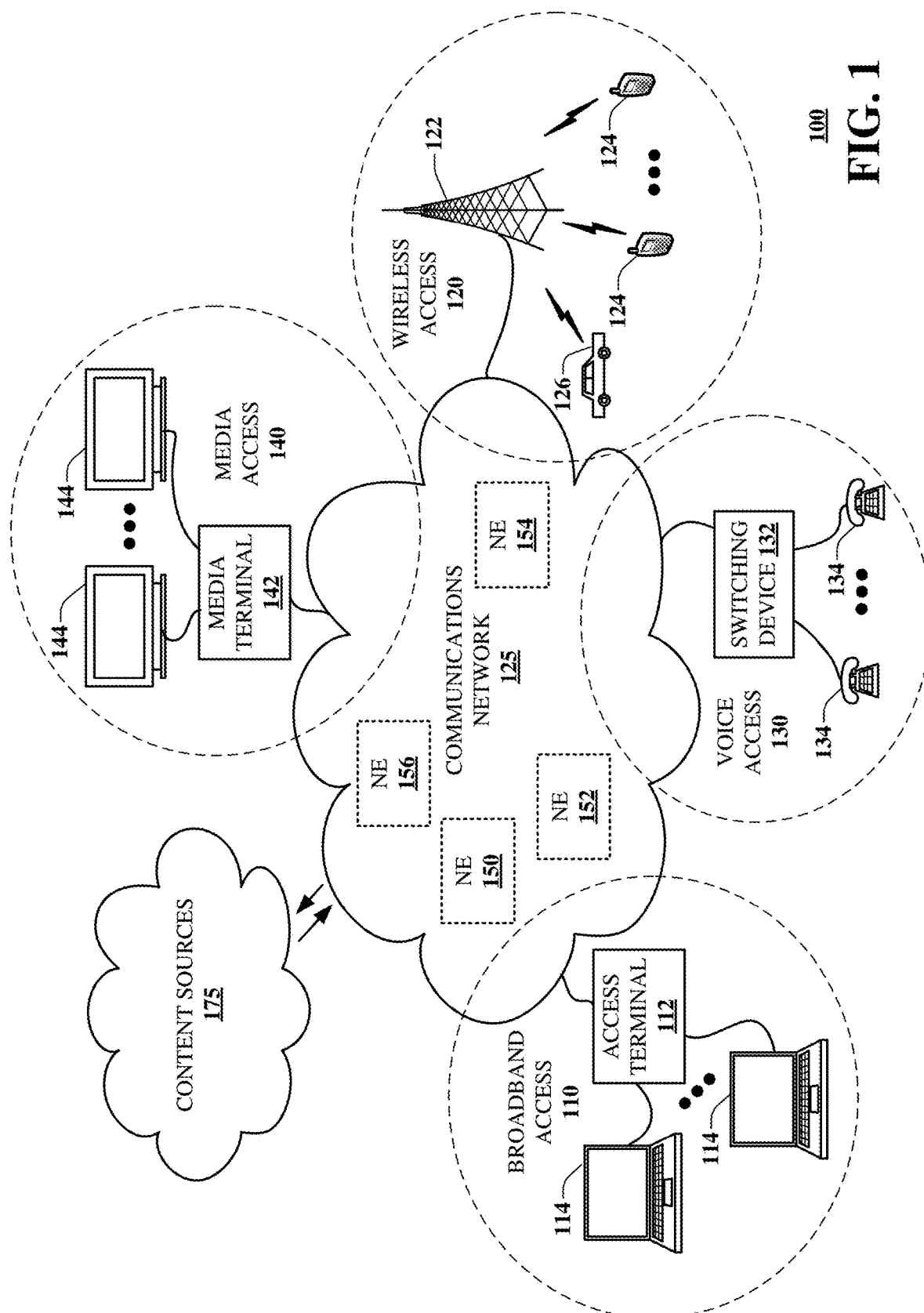
FIG. 1 is a block diagram illustrating an exemplary, non-limiting embodiment of a communications network in accordance with various aspects described herein.

The subject disclosure describes, among other things, illustrative embodiments for obtaining a first E-UTRAN cell global identifier (ECGI) associated with an aerial base station, determining a location of the aerial base station, and determining that a terrestrial base station is within a distance threshold of the location of the aerial base station. Further embodiments can include providing the first ECGI of the aerial base station to the terrestrial base station, and providing first instructions to the terrestrial base station to obtain an ECGI from each terrestrial communication device communicatively coupled to the terrestrial base station resulting in a group of terrestrial communication devices. Each of the group of terrestrial communication devices obtain the ECGI for each of a group of neighboring base stations resulting in a group of ECGIs associated with the group of neighboring base stations. The group of terrestrial communication devices provides the group of ECGIs to the terrestrial base station. Additional embodiments can include configuring a neighboring list with the group of ECGIs associated with the group of neighboring base stations, and providing second instructions to the terrestrial base station to identify as high priority a second ECGI associated with the aerial base station within the neighboring list based on the first ECGI of the aerial base station provided by the device resulting in an identification. Other embodiments are described in the subject disclosure.

One or more aspects of the subject disclosure include a device, comprising a processing system including a processor, and a memory that stores executable instructions that, when executed by the processing system, facilitate performance of operations. Operations can comprise obtaining a first E-UTRAN cell global identifier (ECGI) associated with an aerial base station, determining a location of the aerial base station, and determining that a terrestrial base station is within a distance threshold of the location of the aerial base station. Further operations can comprise providing the first ECGI of the aerial base station to the terrestrial base station, and providing first instructions to the terrestrial base station to obtain an ECGI from each terrestrial communication device communicatively coupled to the terrestrial base station resulting in a group of terrestrial communication devices. Each of the group of terrestrial communication devices obtain the ECGI for each of a group of neighboring base stations resulting in a group of ECGIs associated with the group of neighboring base stations. The group of terrestrial communication devices provides the group of ECGIs to the terrestrial base station. Additional operations can comprise configuring a neighboring list with the group of ECGIs associated with the group of neighboring base stations, and providing second instructions to the terrestrial base station to identify as high priority a second ECGI associated with the aerial base station within the neighboring list based on the first ECGI of the aerial base station provided by the device resulting in an identification.

One or more aspects of the subject disclosure include a non-transitory, machine-readable medium, comprising executable instructions that, when executed by a base station including a processor, facilitate performance of operations. The operations can comprise receiving first instructions from a network management device that indicate to instruct each of a group of terrestrial communication devices communicatively coupled to the base station to obtain an E-UTRAN cell global identifier (ECGI) for each of a group of neighboring base stations, and providing second instructions to each of the group of terrestrial communication devices that indicate to obtain the ECGI for each of the group of neighboring base stations. Further operations can comprise receiving, from each of the group of terrestrial communication devices, the ECGI for each of the group of neighboring base stations resulting in a group of ECGIs, and configuring a neighboring list with the group of ECGIs associated with the group of neighboring base stations, receiving a first ECGI associated with an aerial base station from the network management device. Additional operations can comprise identifying as high priority a second ECGI associated with the aerial base station within the neighboring list based on the first ECGI of the aerial base station provided by the network management device resulting in an identification.

One or more aspects of the subject disclosure include a method. The method can comprise receiving, by a terrestrial communication device including a processor, first instructions from a terrestrial base station to obtain an E-UTRAN cell global identifier (ECGI) for each of a group of neighboring base stations resulting in a group of ECGIs, and obtaining, by the terrestrial communication device, the ECGI for each of the group of neighboring base stations resulting in the group of ECGIs. Further, the method can comprise providing, by the terrestrial communication device, the group of ECGIs to the terrestrial base station. The terrestrial base station configures a neighboring list with the group of ECGIs. The terrestrial base station receives a first ECGI associated with an aerial base station provided by a network management device. The terrestrial base station identifies as high priority a second ECGI associated with the aerial base station within the neighboring list based on the first ECGI received from the network management device resulting in an identification. In addition, the method can comprise providing, by the terrestrial communication device, a first measurement report to the terrestrial base station that identifies a first signal from the aerial base station associated with a first signal strength. The terrestrial base station determines that the first signal strength is above a first signal strength threshold resulting in a determination. The terrestrial base station conducts a first handover of the terrestrial communication device from the terrestrial base station to the aerial base station based on the determination and the identification.

Referring now to FIG. 1, a block diagram is shown illustrating an example, non-limiting embodiment of a system 100 in accordance with various aspects described herein. For example, system 100 can facilitate in whole or in part in identifying an aerial base station in mobile networks. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A-2D is a block diagram illustrating example, non-limiting embodiments of a system functioning within the communication network of FIG. 1 in accordance with various aspects described herein.

In one or more embodiments, one or more aerial base stations (or evolved Node Bs (eNBs)) also known as a flying Cell on Wings (COW) can act as a cell site on an unmanned aerial vehicle (UAV) (e.g., drone). It is designed to beam LTE coverage from the sky to user end devices or communication devices associated with users on the ground during disasters or big events. The aerial base station can carry a small cell and antennas. Aerial base stations can use satellite or terrestrial base stations as backhaul, to transport texts, voice or video calls, and data. Further, aerial base stations can operate in extremely remote areas where wired or wireless infrastructure is not immediately available. In addition, aerial base stations provide LTE coverage from the sky to a designated area on the ground. Also, aerial base station can be easier to deploy than terrestrial base station due to its small size and inherent portability. An aerial base station can provide coverage that can be a larger footprint than comparable terrestrial base stations because it can potentially fly at altitudes over 300 feet, which expands its coverage more than comparable terrestrial base stations. Further, multiple aerial base stations can be deployed to expand the coverage footprint.

In one or more embodiments, an aerial base station can be used to add additional capacity to high data traffic (terrestrial) hotspot, congested areas as well as fill in areas the macro-network does not cover, has zoning limitations or is deploying terrestrial base stations is expensive. An aerial base station can carry a small cell (i.e., microcell, picocell, or femtocell) and antennas. Small cells are low-powered radio access nodes that usually have coverage range much smaller than macro cells. A small cell base station is typically a low cost, small, and simple unit that connects to the operator mobile network through wireless or wired connection. An aerial base station can offer many benefits that include improved data throughput for users, increased capacity in portions of the network, and filling in for coverage. The integration of an aerial base station with terrestrial base stations through a heterogeneous network can be useful in conducting seamless handovers and increasing the data capacity to terrestrial user end devices or terrestrial communication devices.

In one or more embodiments, automatic neighbor relations (ANR) is a standard self-optimization feature to dynamically build and maintain optimal neighbor lists for each cell/base station in real-time. ANR can constantly maintain optimal neighbor lists (NL) per cell/base station by identifying missing neighbors, unused cells, and automatically reconfigures without user intervention. This is done based on terrestrial communication devices reporting signal strength from neighboring base stations/cells. ANR can yield an optimized NL, which yields to improvements in terms of handover (HO) timings, number of successful HOs, and reduction in drop call rates that occur due to missing neighbor relations (NRs). Further, ANR can minimize manual handling of neighbor relations when establishing new base stations and when optimizing neighbor lists. In addition, ANR is ideal for network roll-outs where cell sites are launched one at a time because it automatically adapts to the changing network topology In one or more embodiments, a given base station/cell may learn the identity of two neighboring base stations/cells through ANR, which have the same physical cell identifier (PCI) and frequency. This issue is known as PCI confusion. Under this situation, the intermediate base station/cell may not be able to determine the correct destination for HO target. This will yield to HO failure. PCI confusion may be resolved by an external solution (e.g., SON-Self Optimized Network). The solution may delete one of the duplicated entries with the same PCI.

In one or more embodiments, a mobile network operator can configure terrestrial communication devices to report neighboring base stations/cells' signal strength and PCI when A3-event is triggered. A3-event is triggered when neighboring cell becomes an offset better (in signal strength) than serving base station/cell. In general, a mobile network operator requires the PCI and rsrsp/rsrq (signal strengths) of neighboring base stations/cells in A3 measurement reports. A mobile network operator can also require the terrestrial communication devices to include E-UTRAN cell global identifier (ECGI) information of neighboring base station/cell in A3 measurement reports. A mobile network operator may require terrestrial communication devices to include ECGI information of neighboring base station cell in A3 measurement reports during initial network rollout and when new base stations/cells have been added. This information is needed to update neighboring list. ECGI is a globally unique identifier for a base station (compare to a PCI which is only a locally unique identifier of a base station).

For terrestrial communication devices to receive and decode neighboring base station/cell ECGI, each terrestrial communication devices needs to decode MIB/SIBs of the target bas station/cell. Decoding MIB/SIB in active mode requires a terrestrial communication device to disconnect from serving base station/cell to tune to a neighboring base station/cell. A terrestrial communication device cannot use Measurement GAPs to decode MIB/SIB s of the target base station/cell, since these Measurement GAPs do not give a terrestrial communication device enough time to measure MIB/SIB s of target base station/cell in connected mode. Therefore, a terrestrial communication device needs to use DRX-OFF (disconnected mode) cycles to measure MIB/SIE s. Using DRX-Cycle, a terrestrial communication device can have enough time to measure MIB/SIBs of target base station/cell. The mobile network operator cannot send or receive any data during the DRX-OFF cycles from/to the terrestrial communication device. Note, a mobile network operator can configure short or long DRX-Cycle for its terrestrial communication devices.

During its DRX-Cycle, a terrestrial communication device may detect and measure multiple neighboring base stations/cells, depending on the length of the DRX-Cycle. After DRX-OFF cycle expires, the terrestrial communication device can connect back to serving base station/cell and report neighboring information (rsrp/PCI/ECGI) back to serving base station/cell. When the terrestrial communication device disconnects from the serving base station/cell, it stops its TX/RX transmission with the serving base station/cell. The terrestrial communication device may enter multiple times into DRX-OFF cycle (which may be long DRX-cycles) and spend large amount of time disconnected to serving base station/cell. This can impact important data transmission/reception. Wireless operators prefer to use PCI reporting instead of ECGI reporting when detecting neighboring base stations/cells because it does not disrupt UE transmission/reception. However, although it may be a drawback to utilize ECGIs in an NL due to terrestrial communication devices being disconnected from the serving base station for a period of time, in some instances, this drawback may be outweighed by the benefit of avoiding PCI confusion in conducting handovers by using ECGI instead.

Figure 2A:
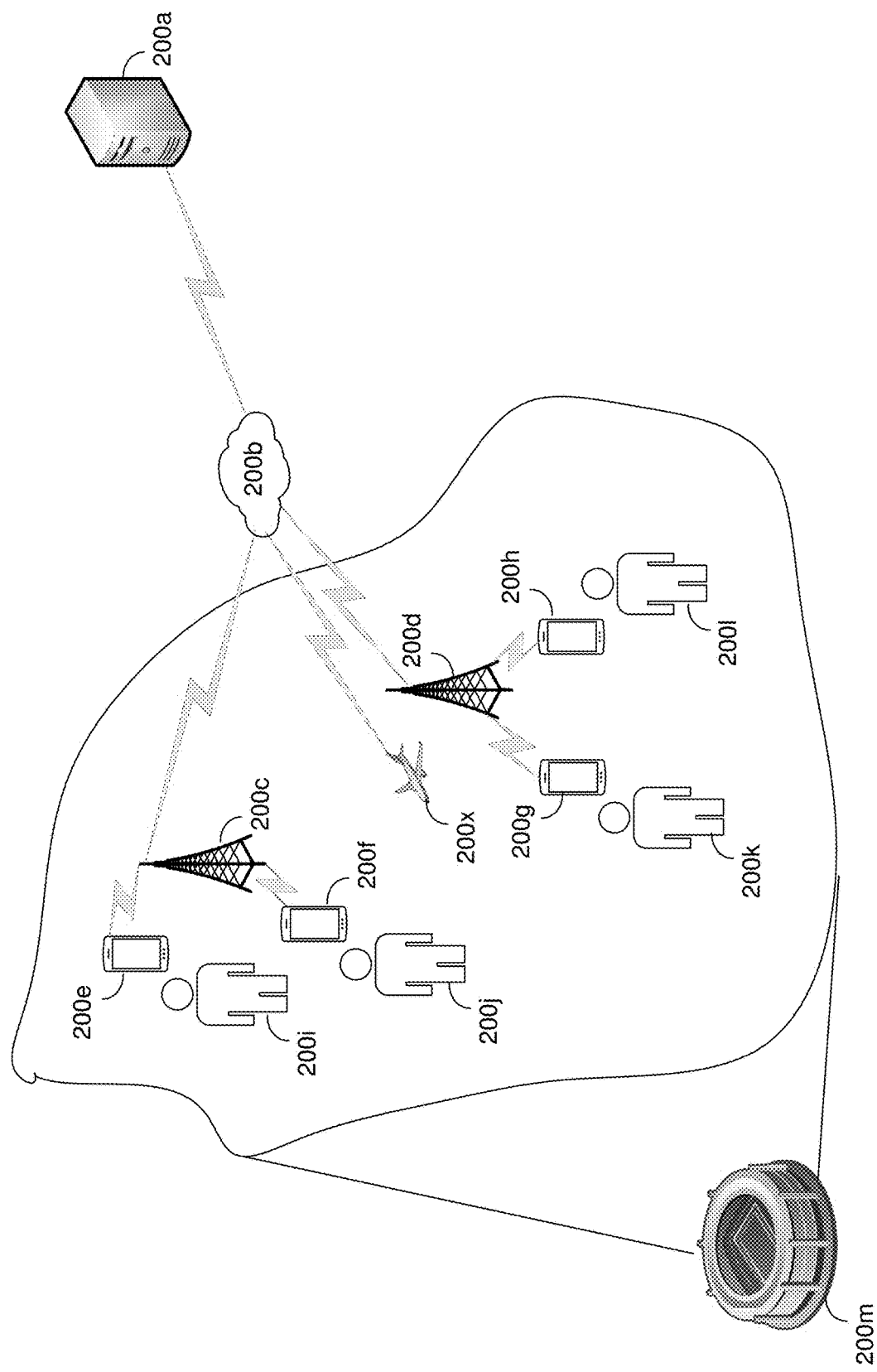
Figure 2B:
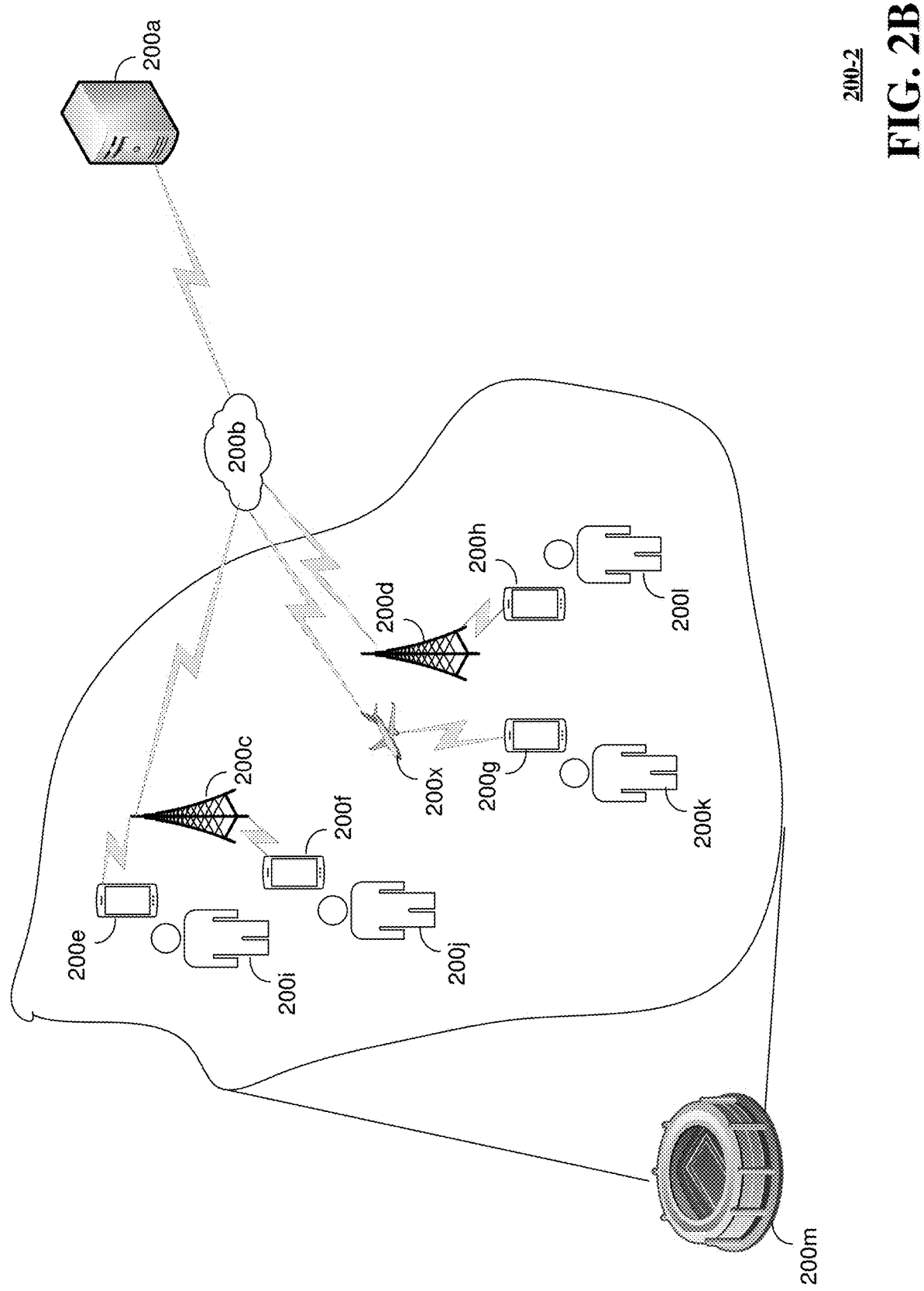

Referring to FIG. 2A, in one or more embodiments, system 200-1 can comprise a network management device 200a communicatively coupled to a terrestrial base station 200c, terrestrial base station 200d and aerial base station 200x over communication network 200b. Further, terrestrial communication device 200e associated with user 200i and terrestrial communication device 200f associated with user 200j, each can be communicatively coupled to terrestrial base station 200c. In addition, terrestrial communication device 200g associated with user 200k and terrestrial communication device 200h associated with user 200l, each can be communicatively coupled to terrestrial base station 200d. Network management device 200a can comprise one or more servers in one location, one or more servers spanning multiple locations, one or more virtual servers in one location, one or more virtual servers spanning multiple locations, or one or more cloud servers. Communication network 200b can comprise one or more wireless communication networks, one or more wired communication networks, or a combination thereof. Each of terrestrial communication device 200e, terrestrial communication device 200f, terrestrial communication device 200g, and terrestrial communication device 200h can comprise a mobile device, mobile phone, smartphone, tablet computer, wearable device, smartwatch, virtual reality device, augmented reality device, cross reality device or a combination thereof.

In one or more embodiments, a mobile network operator can use an aerial base station 200x to offload data traffic from terrestrial base station 200c or terrestrial base station 200d. This can be due to a special event (i.e., concert) held at a stadium 200m. In some embodiments, traffic offloading can be done by more than one aerial base station and can last several hours. Under such circumstances, aerial base station 200x can be used to offload traffic from terrestrial base station 200c and/or terrestrial base station 200d, therefore terrestrial communication device 200e, terrestrial communication device 200f, terrestrial communication device 200g and terrestrial communication device 200h can choose to be communicatively coupled with the aerial base station 200x rather than a terrestrial base station 200c or terrestrial base station 200d.

In one or more embodiments, the aerial base station 200x can deployed quickly for the event held at the stadium 200m. Mobile network operators can use a PCI for this aerial base station 200x that may have already been used by terrestrial base station 200c and terrestrial base station 200d. If ANR is being used in the mobile network, then any of the terrestrial communication devices will only read PCI to identify the aerial base station 200x, terrestrial base station 200c, and terrestrial base station 200d, which may not be unique. Hence, it is essential for the terrestrial communication devices located in proximity to the stadium 200m to differentiate the aerial base station 200x from the terrestrial base station 200c and terrestrial base station 200d to offload traffic accordingly.

In one or more embodiments, the network management device 200a can identify that the cell associated with terrestrial base station 200c and the cell associated with the terrestrial base station 200d may experience congestion during an event associated with the stadium 200m. Thus, the network management device 200a can deploy the aerial base station 200x to a location in proximity to the stadium 200m to alleviate the congestion of the cell associated with terrestrial base station 200c and/or the cell associated with the terrestrial base station 200d. Further, the network management device 200a can obtain, from the aerial base station 200x or from another network device, the ECGI associated with the aerial base station as well as obtain (or estimate) the location where the aerial base station is deployed. In addition, the network management device 200a can identify the terrestrial base station 200c and/or terrestrial base station 200d that are experiencing congestion in proximity to the aerial base station 200x (e.g., within a distance threshold), and can offload data traffic to the aerial base station 200x. This can be done by comparing geolocation of aerial base station 200x and terrestrial base station 200c and terrestrial base station 200d in accordance with propagation models.

In one or more embodiments, the network management device 200a can provide instructions terrestrial base station 200c and terrestrial base station 200d to perform the several actions. These actions can include terrestrial base station 200c providing instructions to terrestrial communication device 200e and terrestrial communication deice 200f as well as terrestrial base station 200d providing instructions to terrestrial communication device 200g and terrestrial communication device 200h that indicate for each of terrestrial communication device 200e, terrestrial communication device 200f, terrestrial communication device 200g, and terrestrial communication device 200h to include reportCGI object into their respective measuring reports. By doing so, each terrestrial communication device can be forced to read SIB1 of neighboring base stations, and obtain the ECGI from SIB1 thereby obtaining the ECGI of each neighboring base station. ECGI is unique identifier for each base station. Each terrestrial communication device can report the ECGI of each neighboring base station, which can include the aerial base station 200x.

In one or more embodiments, the network management device 200a can provide instructions to each of terrestrial base station 200c and terrestrial base station 200d to add ECGI of the aerial base station 200x into their respective neighboring list and label/identify this ECGI as high priority. By doing so, the terrestrial base station 200c and/or terrestrial base station can select the aerial base station 200x for handover if the signal strength of a signal from the aerial base station 200x is acceptable (e.g., above a threshold), thereby offloading data traffic from the terrestrial base stations.

In one or more embodiments, the network management device 200a can provide instructions to terrestrial base station 200c and terrestrial base station 200d to have terrestrial communication device 200e, terrestrial communication device 200f, terrestrial communication device 200g, and terrestrial communication device 200h to add a bias factor as a cell individual offset (CIO) factor to the measured signal strength (reference signal received power (rsrp)) of a signal associated with the aerial base station 200x and recorded in a respective measurement report. The CIO factor is sent by each terrestrial base station to all its associated terrestrial communication devices at the moment of attachment (CIO factor is included in RRC.connection message). If a terrestrial communication device is already communicatively coupled to a terrestrial base station, the terrestrial base station can send an RRC.ReconecctionReconfiguration message that includes the CIO factor. CIO factor is expressed in "dbm" and it is meant to be used by terrestrial communication device to be added to measured signal strength of a signal associated with the aerial base station 200x.

In one or more embodiments, a terrestrial communication device can send a A3 reporting message to its terrestrial base station. That is, a measurement report is provided from the terrestrial communication device to the terrestrial base station when a signal from neighboring base station is stronger than a signal from the serving terrestrial base station. It includes PCI/ECGI of neighboring base station and their corresponding signal strength values (measured by the terrestrial communication device). If serving terrestrial base station has already included a CIO factor in RRC.connection/RRC.ReconnectionReconfiguration message to the terrestrial communication device, then the terrestrial communication device can report signal strength (e.g., rsrp) in addition to the CIO factor for the neighboring aerial base station 200x. If the terrestrial base station has chosen a specific CIO factor (i.e., CIO=5 dbm), then the terrestrial communication device reports that neighboring aerial base station with signal strength (e.g., rsrp) 5 dbm stronger than it measured resulting in an adjusted signal strength measurement. This can force a terrestrial base station to handover a terrestrial communication device to the aerial base station to alleviate data traffic congestion in its associated cell. Note, without the CIO factor adjusting the measured signal strength of the aerial base station, the terrestrial base station would not conduct the handover to it, thereby still suffer from the data traffic congestion.

In one or more embodiments, for example, a terrestrial communication device 200g is communicatively coupled to terrestrial base station 200d. Further, the terrestrial base station 200d has provided terrestrial communication device 200g with a CIO factor of 5 dbm to add to any measured signal strength of a signal associated with aerial base station 200x. Further, terrestrial communication device 200g scans neighboring base stations and measures the respective signal strengths of detected signals from each neighboring base station. Thus, terrestrial communication device 200g can measure the signal strength (e.g., rsrp1) of a signal from terrestrial base station 200c, measure the signal strength (e.g., rsrp2) of a signal from terrestrial base station 200d, and measure the signal strength (e.g., rsrp3) of a signal from aerial base station 200x. In addition, the measured signal strengths can have the following relationship: rsrp2>rsrp1>rsrp3. However, when the CIO factor is added to the signal strength of the signal from the aerial base station 200x resulting in an adjusted signal strength (e.g., rsrp3*), then the measured/adjusted signal strengths can have the following relationship rsrp3*>rsrp2>rsrp1. Consequently, referring to FIG. 2B, when the terrestrial base station 200d receives a measurement report from terrestrial communication device 200g listing that the adjusted signal strength (e.g., rsrp3*) is greater than the signal strength (e.g., rsrp2), then the terrestrial base station 200d can conduct a handover of terrestrial communication device 200g from terrestrial base station 200d to aerial base station 200x. In some embodiments, the network management device 200a can access information from aerial base station 200x to determine the number of terrestrial communication device communicatively coupled to it. If it is less than a threshold, then the network management device 200a can provide a greater CIO factor to provide to the terrestrial base stations to relay to the terrestrial communication devices communicatively coupled to them, respectively, to induce more terrestrial communication devices to be handed over to the aerial base station to offload data traffic from the terrestrial base stations.

Figure 2C:
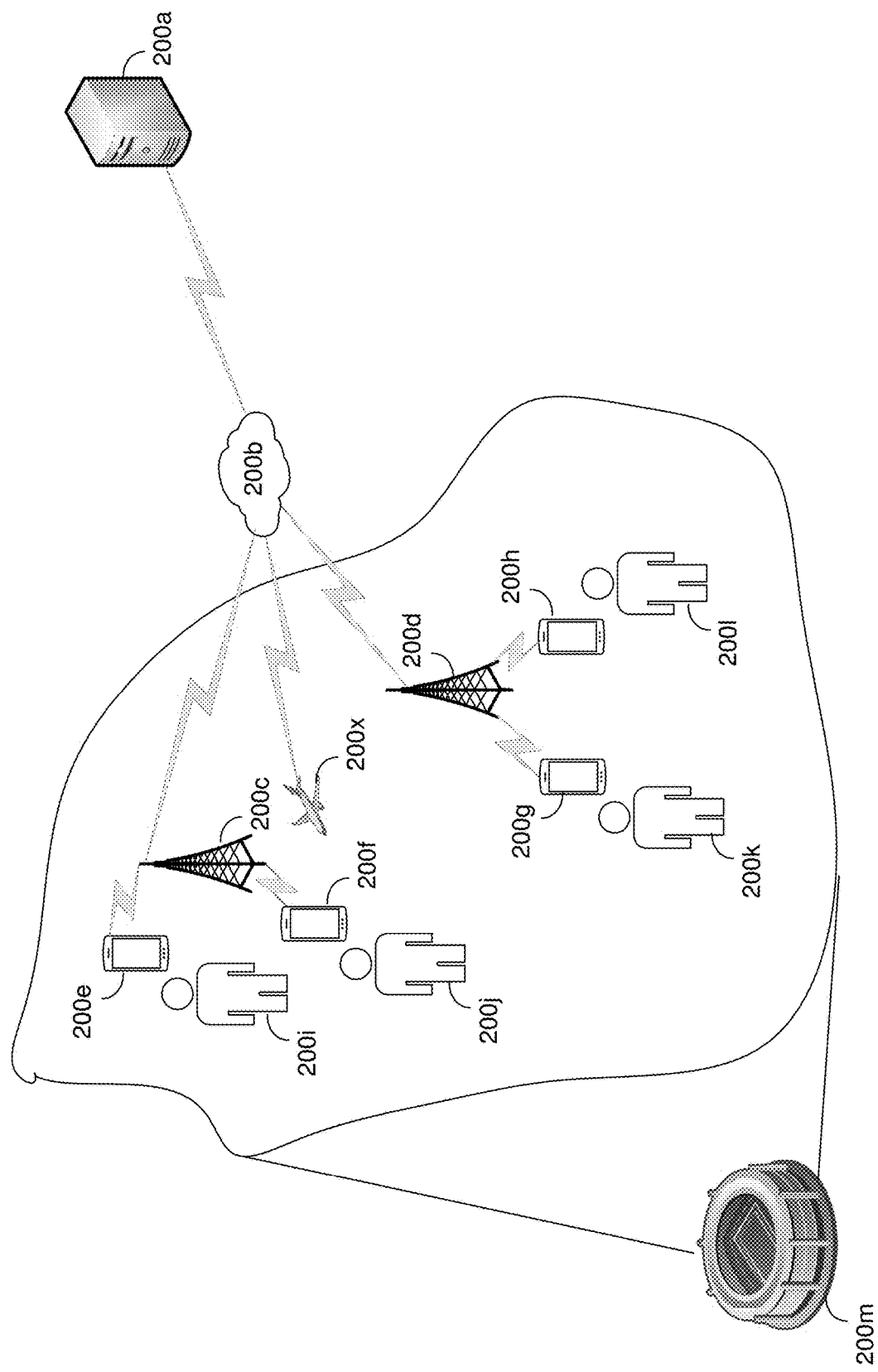

Referring to FIG. 2C, in one or more embodiments, terrestrial communication device 200g can be communicatively coupled to aerial base station 200x. Further, aerial base station 200x can move to another location. Further, terrestrial communication device 200g can measure the signal strength of neighboring base stations including terrestrial base station 200d as well as the signal strength of aerial base station 200x in its current location. Further, the terrestrial communication device 200g can adjust the signal strength of aerial base station 200x with the CIO factor. However, the measured signal strength of terrestrial base station 200d is greater than the adjusted signal strength of aerial base station 200x. Thus, the aerial base station 200x, in conjunction with terrestrial base station 200d, conducts a handover of terrestrial communication device 200g from aerial base station 200x to terrestrial base station 200d.

Referring to FIG. 2D, in one or more embodiments, with the aerial base station 200x at its current location, terrestrial communication device 200f can scan and measure signal strengths of neighboring base stations including aerial base station 200x and compare it with the signal strength of its serving terrestrial base station 200c. Further, the terrestrial communication device 200f can add the CIO factor to the measured signal strength of aerial base station 200x resulting in an adjusted signal strength. In addition, the terrestrial communication device 200f can send terrestrial base station 200c that includes the adjusted signal strength of aerial base station 200x and the measured signal strength of terrestrial communication base station 200c. The terrestrial base station 200c can determine that the adjusted signal strength of aerial base station 200x is greater than the measure signal strength of terrestrial base station 200c such that terrestrial base station 200c conducts a handover of terrestrial communication device 200f from terrestrial base station 200c to aerial base station 200x.

FIGS. 2E-2H depicts illustrative embodiments of methods in accordance with various aspects described herein.

Figure 2E:
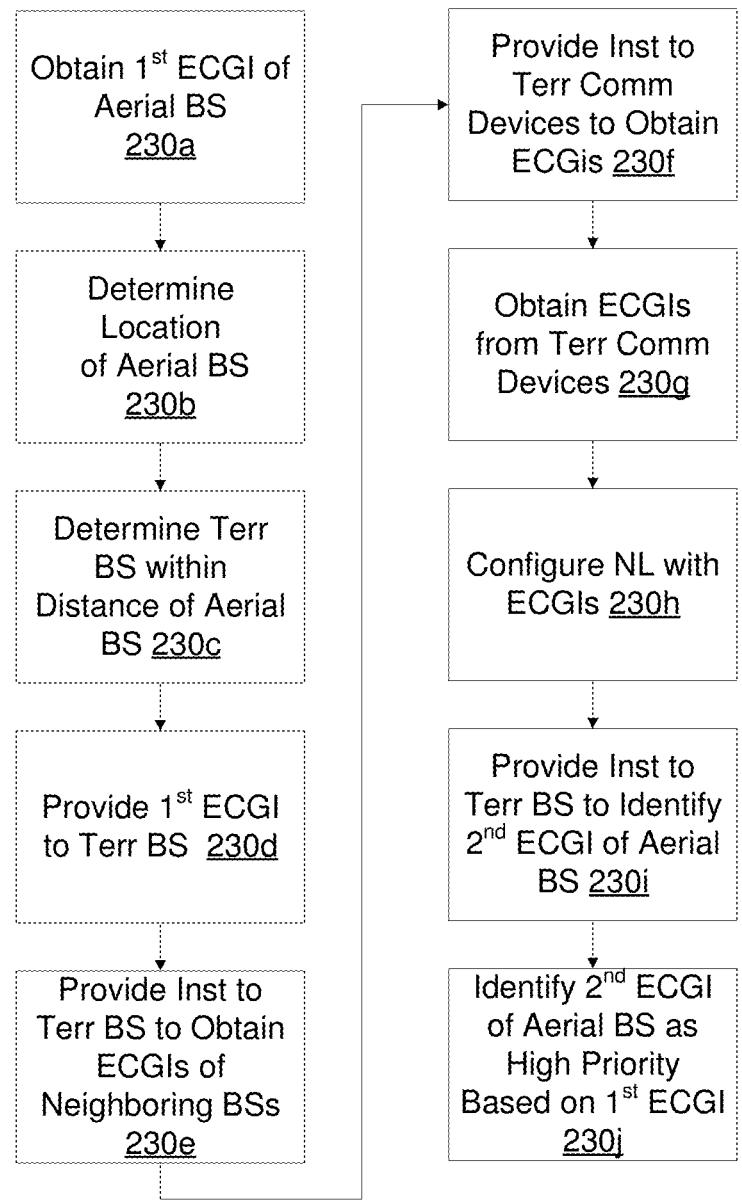
FIGS. 2E-2H depicts illustrative embodiments of methods in accordance with various aspects described herein.

Referring to FIG. 2E, in one or more embodiments, aspects of method 230 can be implemented by a network management device, terrestrial base station, aerial base station, or terrestrial communication device(s). The method 230 can include a network management device 200a, at 230a, obtaining a first E-UTRAN cell global identifier (ECGI) associated with an aerial base station. Further, the method 230 can include the network management device, at 230b, determining a location of the aerial base station. In addition, the method 230 can include the network management device, at 230c, determining that a terrestrial base station is within a distance threshold of the location of the aerial base station. Also, the method 230 can include the network management device, at 230d, providing the first ECGI of the aerial base station to the terrestrial base station. Further, the method 230 can include the network management device, at 230e, providing instructions to the terrestrial base station to obtain an ECGI from each terrestrial communication device communicatively coupled to the terrestrial base station resulting in a group of terrestrial communication devices.

In one or more embodiments, the method 230 can include the terrestrial base station, at 230f, providing instructions to each of the group of terrestrial communication device that indicate to obtain the ECGI of neighboring base stations. Each of the group of terrestrial communication devices obtains the ECGI for each of a group of neighboring base stations resulting in a group of ECGIs associated with the group of neighboring base stations. Each of the group of terrestrial communication devices provides the group of ECGIs to the terrestrial base station. Further, the method 230 can include the terrestrial base station, at 230g, obtaining the ECGIs of neighboring base stations from each of the group of terrestrial communication devices.

In one or more embodiments, the method 230 can include the network management device, at 230h, configuring a neighboring list with the group of ECGIs associated with the group of neighboring base stations. Further, the method 230 can include the network management device, at 230i, providing instructions to the terrestrial base station to identify as high priority a second ECGI associated with the aerial base station within the neighboring list based on the first ECGI of the aerial base station provided by the device resulting in an identification. In addition, the method 230 can include the terrestrial base station, at 230j, identifying as high priority the second ECGI associated with the aerial base station within the neighboring list based on the first ECGI of the aerial base station provided by the device resulting in the identification.

Figure 2F:

Referring to FIG. 2F, in one or more embodiments, aspects of method 235 can be implemented by a network management device, terrestrial base station, aerial base station, or terrestrial communication device(s). The method 235 can include the terrestrial base station, at 235a, receives a group of measurement reports from the group of terrestrial communication devices. The measurement report indicates a first signal associated with a first signal strength associated with the aerial base station. Further, the method 235 can include the terrestrial base station, at 235b, identifying the first signal from the aerial base station associated with the first signal strength. In addition, the method 235 can include the terrestrial base station, at 235c, determining that the first signal strength is above a first signal strength threshold resulting in a first determination. In some embodiments, the first signal strength threshold can be associated with the signal strength of the terrestrial base station. In other embodiments, the first signal strength threshold can be associated with a signal strength that would provide a certain level of Quality of Service for the terrestrial communication device(s). Also, the method 235 can include the terrestrial base station, in conjunction with the aerial base station, at 235d, conducting a first handover of a first terrestrial communication device from the group of terrestrial communication devices from the terrestrial base station to the aerial base station based on the first determination and the identification.

In one or more embodiments, the method 235 can include the terrestrial base station, at 235e, the terrestrial base station receives a group of measurement reports from the group of terrestrial communication devices. The group of measurement reports indicates a second signal from the aerial base station associated with a second signal strength. Further, the method 235 can include the terrestrial base station, at 235f, identifying the second signal from the aerial base station associated with the second signal strength. In addition, the method 235 can include the terrestrial base station, at 235g, determining that the second signal strength is below a second signal strength threshold resulting in a second determination. In some embodiments, the second signal strength threshold can be associated with the signal strength of the terrestrial base station. In other embodiments, the second signal strength threshold can be associated with a signal strength that would provide a certain level of Quality of Service for the terrestrial communication device(s). Also, the method 235 can include the terrestrial base station, in conjunction with the aerial base station, at 235h, conducting a second handover of the first terrestrial communication device from the group of terrestrial communication devices from the aerial base station to the terrestrial base station based on the second determination.

In one or more embodiments, the terrestrial base station provides instructions to each terrestrial communication device of the group of terrestrial communication devices to provide a measurement report that includes a reportCGI object resulting in a group of measurement reports. Each terrestrial communication device of the group of terrestrial communication devices provides a measurement report resulting in the group of measurements reports, each measurement report of the group of measurement reports includes the reportCGI object, and each measurement report indicates the group of ECGIs associated with the group of neighboring base stations.

Figure 2G:
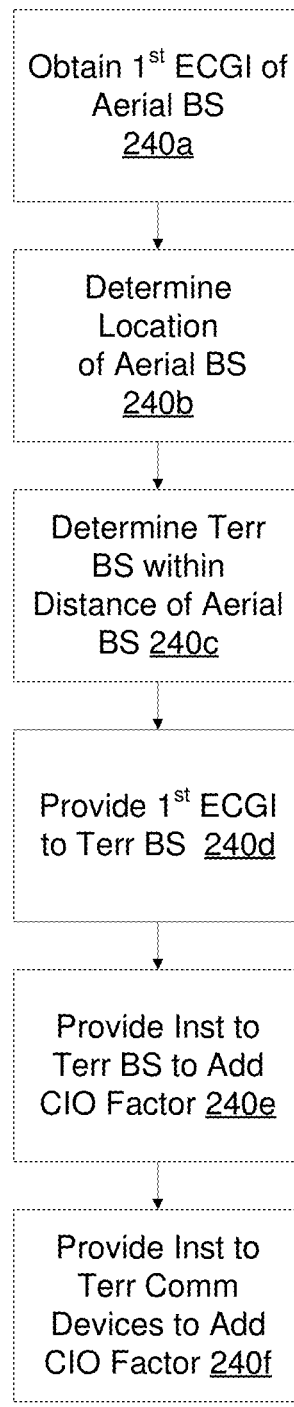

Referring to FIG. 2G, in one or more embodiments, aspects of method 240 can be implemented by a network management device, terrestrial base station, aerial base station, or terrestrial communication device(s). The method 240 can include the network management device, at 240a, obtaining a first E-UTRAN cell global identifier (ECGI) associated with an aerial base station. Further, the method 240 can include the network management device, at 240b, determining a location of the aerial base station. In addition, the method 240 can include the network management device, at 240c, determining that a terrestrial base station is within a distance threshold of the location of the aerial base station. Also, the method 240 can include the network management device, at 240d, providing the first ECGI of the aerial base station to the terrestrial base station. Further, the method 240 can include the network management device, at 240e, providing instructions to the terrestrial base station to indicate to each of a group of terrestrial communication devices communicatively coupled to the terrestrial base station to add a cell individual offset (CIO) factor to a first signal strength associated with a first signal received from the aerial base station. In addition, the method 240 can include the terrestrial base station, at 240f, providing instructions to each of the group of terrestrial communication devices to add a CIO factor to the first signal strength associated with the first signal received from the aerial base station. The instructions to each terrestrial communication device include the first ECGI associated with the aerial base station.

Figure 2H:
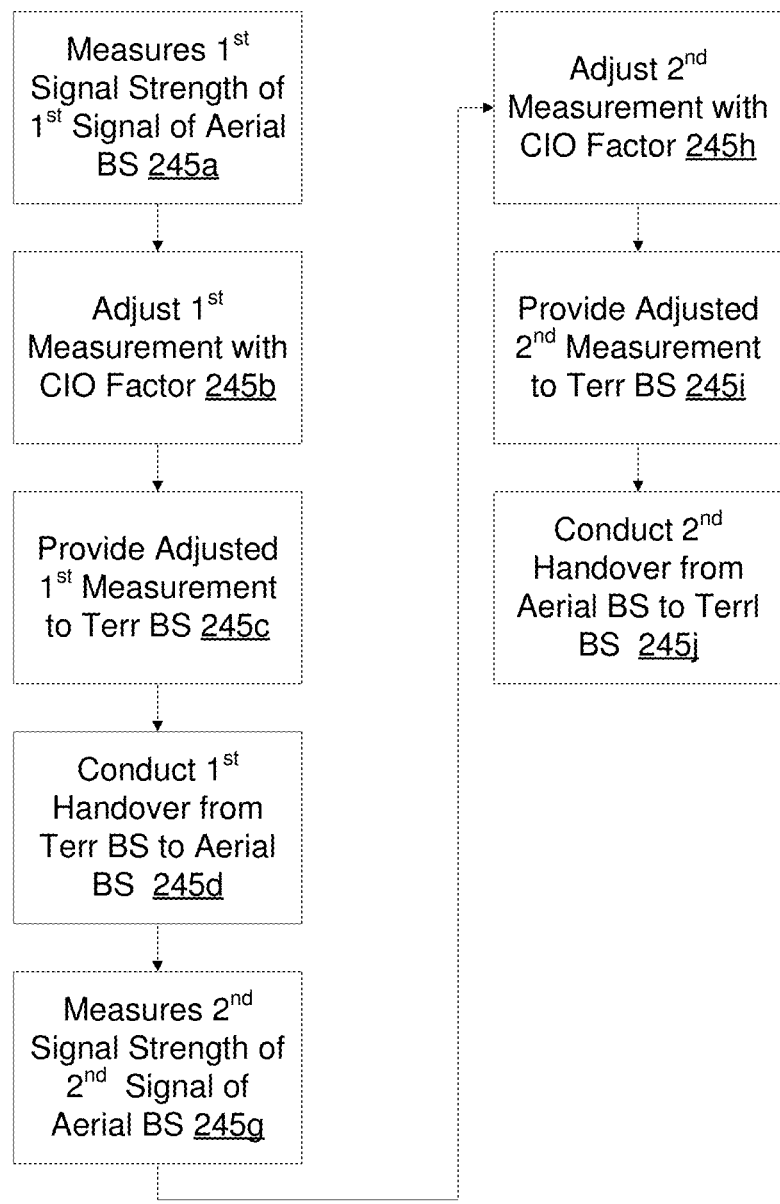

Referring to FIG. 2H, in one or more embodiments, aspects of method 245 can be implemented by a network management device, terrestrial base station, aerial base station, or terrestrial communication device(s). The method 245 can include a first terrestrial communication device of the group of terrestrial communication devices, at 245a, measuring the first signal strength of the first signal based on the first ECGI resulting in a first measurement. Further, the method 245 can include the first terrestrial communication device, at 245b, adjusting the first measurement of the first signal strength by adding the CIO factor to the first measurement resulting in an adjusted first measurement. In addition, the method 245 can include the first terrestrial communication device, at 245c, providing the adjusted first measurement to the terrestrial base station. In some embodiments, the first terrestrial communication device provides a first measurement report, and the first measurement report includes the adjusted first measurement. Also, the method 245 include the terrestrial base station, at 245d, conducting a first handover of the first terrestrial communication device from the terrestrial base station to the aerial base station based on the adjusted first measurement. In some embodiments, the conducting of the first handover is done in response to the adjusted first measurement being above a signal strength threshold as described herein.

In one or more embodiments, the method 245 includes the first terrestrial communication device, at 245g, measuring a second signal strength of a second signal associated with the aerial base station resulting in a second measurement. Further, the method 245 includes the first terrestrial communication device, at 245h, adjusting the second measurement by adding the CIO factor to the second measurement resulting in an adjusted second measurement. In addition, the method 245 can include the first terrestrial communication device, at 245i, providing the adjusted second measurement to the terrestrial base station. Also, the method 245 can include the terrestrial base station, at 245j, conducting a second handover of the first terrestrial communication device from the aerial base station to the terrestrial base station based on the adjusted second measurement. In some embodiments, the conducting of the second handover is done in response to the adjusted first measurement being above a signal strength threshold as described herein.

In some embodiments, the providing of the instructions from the terrestrial base station to each of the group of terrestrial communication devices comprises providing the CIO factor within a RRC.connection.message to each of the group of terrestrial communication devices. In other embodiments, the providing of the second instructions from the terrestrial base station to each of the group of terrestrial communication devices comprises providing the CIO factor within a RRC.ReconnectionReconfiguration.message to each of the group of terrestrial communication devices.

In some embodiments, the aerial base station has been deployed to offload data traffic from a group of the group of terrestrial base station, and the adding of the CIO factor to the adjusted first measurement report is done to promote the first handover. In other embodiments, the serving terrestrial base station can receive from the first terrestrial communication device a group of measurements corresponding to a group of neighboring base stations, select the aerial base station from the group of neighboring base stations based on signal strength measurements of the group of neighboring base stations, and conduct a first handover of the first terrestrial communication device from the base station to the aerial base station based on the adjusted first measurement. In further embodiments, a group of serial base stations has been deployed to offload data traffic from a group of terrestrial base stations, and each ECGI of the group of aerial base stations are assigned a higher priority than the group of terrestrial base stations to promote a handover of a terrestrial communication device from one of the group of terrestrial base stations to one of the group of aerial base stations While for purposes of simplicity of explanation, the respective processes are shown and described as a series of blocks in FIGS. 2E-2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

Portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200-1, 200-2, 200-3, and 200-4 and methods 230, 235, 240, and 245 presented in FIGS. 1, 2A-2H, and 3. For example, virtualized communication network 300 can facilitate in whole or in part in identifying an aerial base station in mobile networks.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
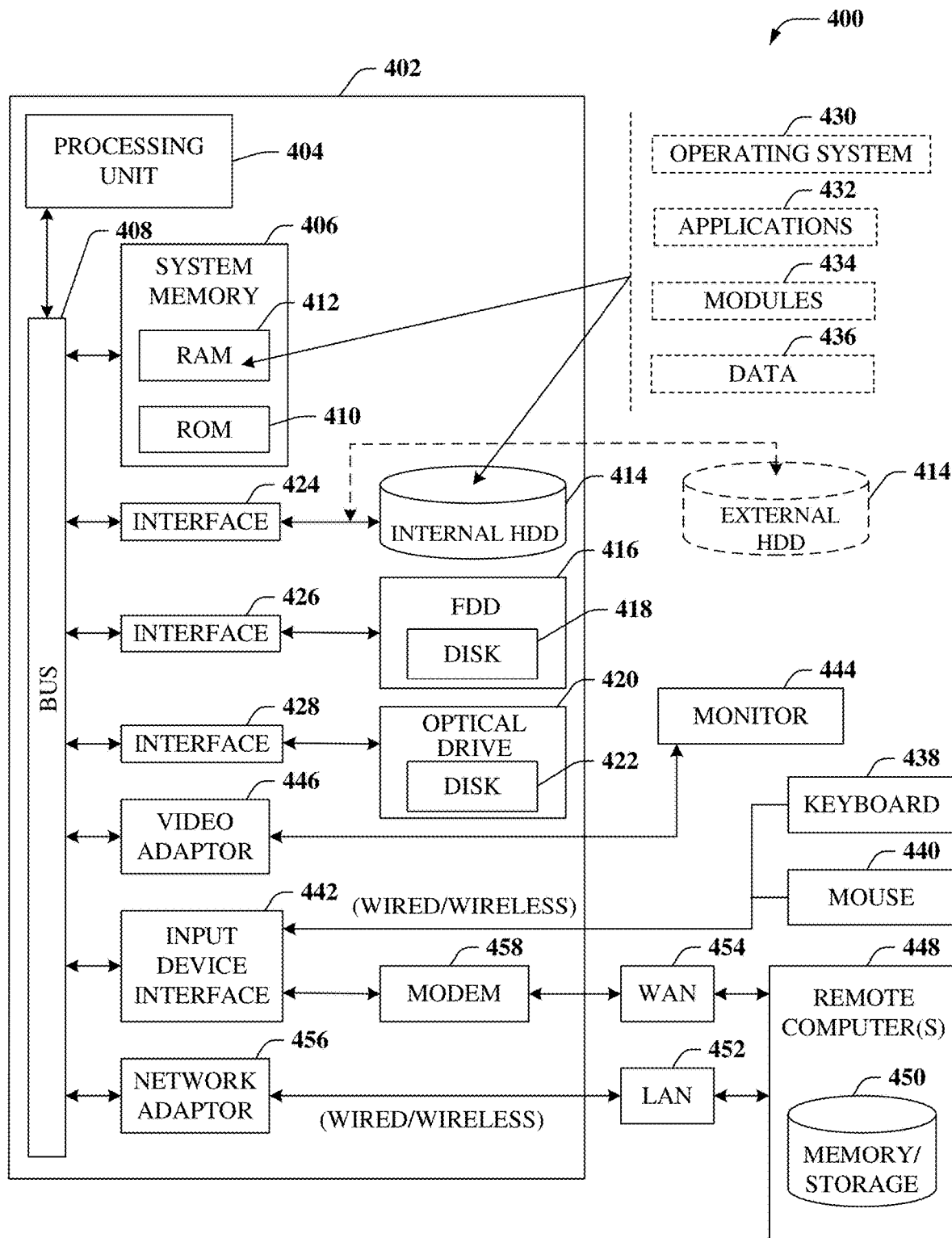
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part in identifying an aerial base station in mobile networks. Further, network management device 200a, terrestrial base station 200c, terrestrial base station 200d, terrestrial communication device 200e, terrestrial communication device 200f, terrestrial communication device 200g, terrestrial communication device 200h, and aerial base station 200x each cam comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418)

and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
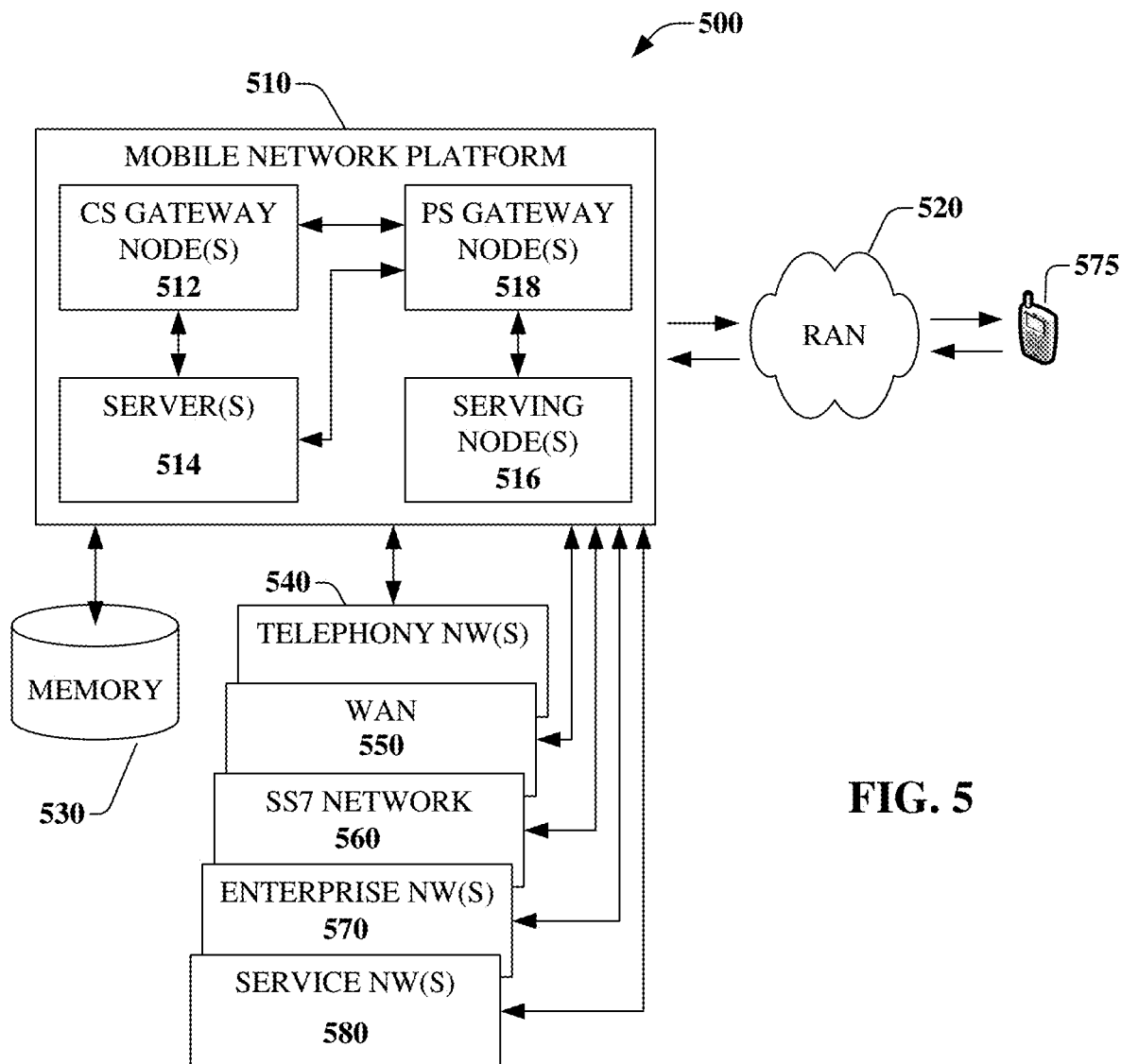
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part in identifying an aerial base station in mobile networks. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
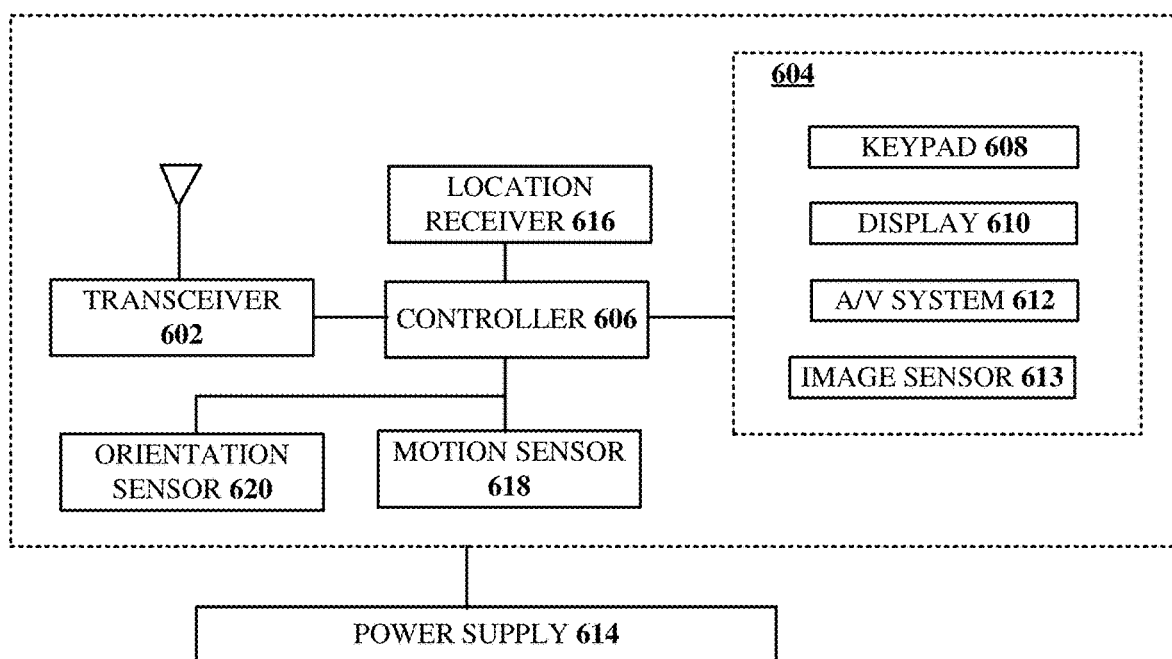
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part in identifying an aerial base station in mobile networks. Further, network management device 200a, terrestrial base station 200c, terrestrial base station 200d, terrestrial communication device 200e, terrestrial communication device 200f, terrestrial communication device 200g, terrestrial communication device 200h, and aerial base station 200x each cam comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a first E-UTRAN cell global identifier (ECGI) associated with an aerial base station;
determining a location of the aerial base station;
determining that a terrestrial base station is within a distance threshold of the location of the aerial base station;
providing the first ECGI of the aerial base station to the terrestrial base station;
providing first instructions to the terrestrial base station to obtain an ECGI from each terrestrial communication device communicatively coupled to the terrestrial base station resulting in a group of terrestrial communication devices, wherein each of the group of terrestrial communication devices obtain the ECGI for each of a group of neighboring base stations resulting in a group of ECGIs associated with the group of neighboring base stations, wherein the group of terrestrial communication devices provides the group of ECGIs to the terrestrial base station;
configuring a neighboring list with the group of ECGIs associated with the group of neighboring base stations; and
providing second instructions to the terrestrial base station to identify as high priority a second ECGI associated with the aerial base station within the neighboring list based on the first ECGI of the aerial base station provided by the device resulting in an identification.

2. The device of claim 1, wherein the terrestrial base station identifies a first signal from the aerial base station associated with a first signal strength, wherein the terrestrial base station determines that the first signal strength is above a first signal strength threshold resulting in a first determination, wherein the terrestrial base station conducts a first handover of a first terrestrial communication device from the group of terrestrial communication devices from the terrestrial base station to the aerial base station based on the first determination and the identification.

3. The device of claim 2, wherein the terrestrial base station receives a first group of measurement reports from the group of terrestrial communication devices, wherein the first group of measurement reports indicates a second signal from the aerial base station associated with a second signal strength.

4. The device of claim 3, wherein the terrestrial base station determines that the second signal strength is below a second signal strength threshold resulting in a second determination, wherein the terrestrial base station conducts a second handover of the first terrestrial communication device from the group of terrestrial communication devices from the aerial base station to the terrestrial base station based on the second determination.

5. The device of claim 2, wherein the terrestrial base station identifies the first signal from the aerial base station and the first signal strength from a first measurement report obtained from the first terrestrial communication device of the group of terrestrial communication devices.

6. The device of claim 1, wherein the terrestrial base station provides third instructions to each terrestrial communication device of the group of terrestrial communication devices to provide a measurement report that includes a reportCGI object resulting in a second group of measurement reports.

7. The device of claim 6, wherein each terrestrial communication device of the group of terrestrial communication devices provides a measurement report resulting in the second group of measurements reports.

8. The device of claim 7, wherein each measurement report of the second group of measurement reports includes the reportCGI object.

9. The device of claim 7, wherein a group of serial base stations has been deployed to offload data traffic from a group of terrestrial base stations, and wherein each ECGI of the group of aerial base stations are assigned a higher priority than the group of terrestrial base stations to promote a handover of a terrestrial communication device from one of the group of terrestrial base stations to one of the group of aerial base stations.

10. A non-transitory, machine-readable medium, comprising executable instructions that, when executed by a base station including a processor, facilitate performance of operations, the operations comprising:
receiving first instructions from a network management device that indicate to instruct each of a group of terrestrial communication devices communicatively coupled to the base station to obtain an E-UTRAN cell global identifier (ECGI) for each of a group of neighboring base stations;
providing second instructions to each of the group of terrestrial communication devices that indicate to obtain the ECGI for each of the group of neighboring base stations;
receiving, from each of the group of terrestrial communication devices, the ECGI for each of the group of neighboring base stations resulting in a group of ECGIs;
configuring a neighboring list with the group of ECGIs associated with the group of neighboring base stations;
receiving a first ECGI associated with an aerial base station from the network management device; and
identifying as high priority a second ECGI associated with the aerial base station within the neighboring list based on the first ECGI of the aerial base station provided by the network management device resulting in an identification.

11. The non-transitory, machine-readable medium of claim 10, wherein the operations further comprise:
identifying a first signal from the aerial base station associated with a first signal strength;
determining that the first signal strength is above a first signal threshold resulting in a first determination; and
conducting a first handover of a first terrestrial communication device from the group of terrestrial communication devices from the base station to the aerial base station based on the first determination and the identification.

12. The non-transitory, machine readable medium of claim 11, wherein the operations comprise receiving a first group of measurement reports from the group of terrestrial communication devices, wherein the first group of measurements reports indicates a second signal from the aerial base station associated with a second signal strength.

13. The non-transitory, machine readable medium of claim 12, wherein the operations comprise:
    determining that the second signal strength is below a second signal strength threshold resulting in a second determination; and
    conducting a second handover of the first terrestrial communication device from the group of terrestrial communication devices from the aerial base station to the base station based on the second determination.

14. The non-transitory, machine-readable medium of claim 11, wherein the identifying the first signal comprises:
    receiving a measurement report from a terrestrial communication device of the group of terrestrial communication devices; and
    identifying the first signal from the aerial base station and the first signal strength from the measurement report.

15. The non-transitory, machine readable medium of claim 10, wherein the operations comprise:
    providing third instructions to each terrestrial communication device of the group of terrestrial communication device to provide a measurement report that includes a reportCGI object resulting in a second group of measurement reports.

16. The non-transitory, machine readable medium of claim 15, wherein the operations comprise receiving a measurement report from each terrestrial communication devices from the group of terrestrial communication devices resulting in the second group of measurement reports.

17. The non-transitory, machine readable medium of claim 15, wherein each measurement report of the second group of measurement reports includes the reportCGI object.

18. The non-transitory, machine readable medium of claim 15, wherein the second group of measurements reports indicate the group of ECGIs associated with the group of neighboring base stations.

19. A method, comprising:
    receiving, by a terrestrial communication device including a processor, first instructions from a terrestrial base station to obtain an E-UTRAN cell global identifier (ECGI) for each of a group of neighboring base stations resulting in a group of ECGIs;
    obtaining, by the terrestrial communication device, the ECGI for each of the group of neighboring base stations resulting in the group of ECGIs;
    providing, by the terrestrial communication device, the group of ECGIs to the terrestrial base station, wherein the terrestrial base station configures a neighboring list with the group of ECGIs, wherein the terrestrial base station receives a first ECGI associated with an aerial base station provided by a network management device, wherein the terrestrial base station identifies as high priority a second ECGI associated with the aerial base station within the neighboring list based on the first ECGI received from the network management device resulting in an identification; and
    providing, by the terrestrial communication device, a first measurement report to the terrestrial base station that identifies a first signal from the aerial base station associated with a first signal strength, wherein the terrestrial base station determines that the first signal strength is above a first signal strength threshold resulting in a determination, wherein the terrestrial base station conducts a first handover of the terrestrial communication device from the terrestrial base station to the aerial base station based on the determination and the identification.

20. The method of claim 19, wherein the providing of the group of ECGIs comprises providing, by the terrestrial communication device, a second measurement report to the terrestrial base station, wherein the second measurement report comprises the group of ECGIs.

* * * * *